No. 859,171. PATENTED JULY 2, 1907.
S. DYER.
VEHICLE.
APPLICATION FILED NOV. 28, 1905.

2 SHEETS—SHEET 1.

Samuel Dyer, Inventor,

Witnesses
Howard D. Orr
B. G. Foster

By E. G. Siggers
Attorney

No. 859,171. PATENTED JULY 2, 1907.
S. DYER.
VEHICLE.
APPLICATION FILED NOV. 28, 1905.
2 SHEETS—SHEET 2.
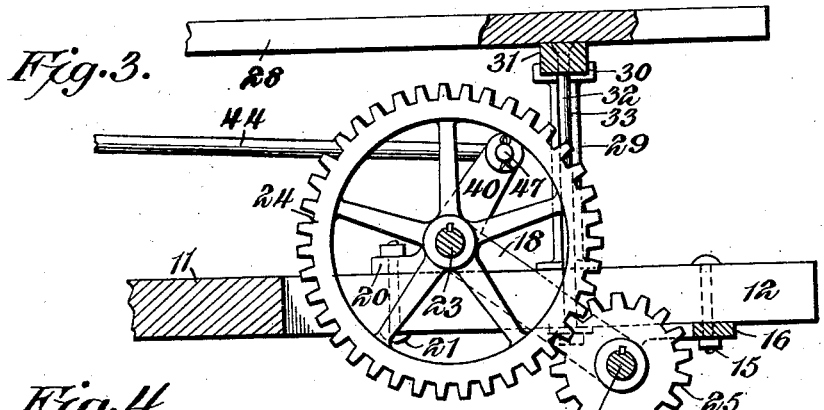
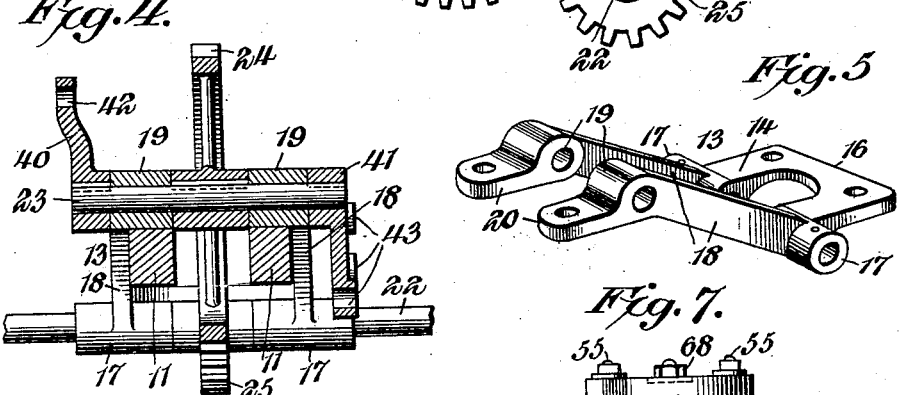
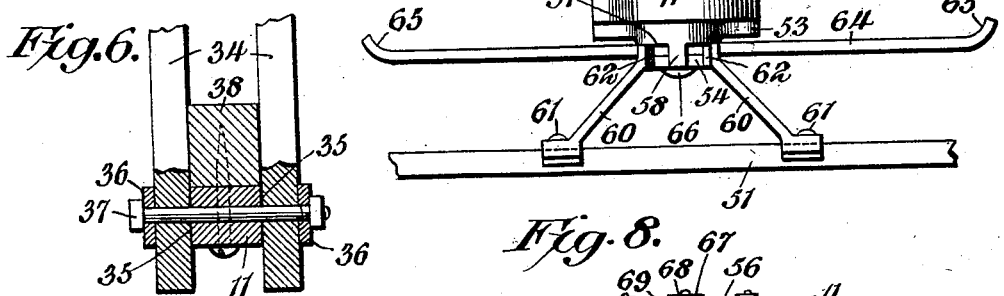
Samuel Dyer, Inventor,
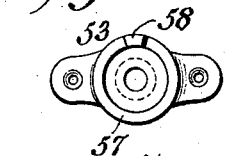
Witnesses
Howard D. Orr
B. G. Foster
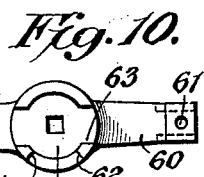
By C. G. Siggers
Attorney
THE NORRIS PETERS CO., WASHINGTON, D. C.

UNITED STATES PATENT OFFICE.

SAMUEL DYER, OF MUNCIE, INDIANA, ASSIGNOR TO GLASCOCK BROS. MFG. CO., OF MUNCIE, INDIANA, A COPARTNERSHIP.

VEHICLE.

No. 859,171.      Specification of Letters Patent.      Patented July 2, 1907.

Application filed November 28, 1905. Serial No. 289,481.

*To all whom it may concern:*

Be it known that I, SAMUEL DYER, a citizen of the United States, residing at Muncie, in the county of Delaware, and State of Indiana, have invented a new and useful Vehicle, of which the following is a specification.

This invention relates to an improved velociman or manually-propelled vehicle, particularly intended for children's use.

One of the principal objects is to provide a vehicle which will not only constitute an agreeable toy, but is so arranged that the relative movements of the operating means may be quickly and conveniently altered in order to bring different sets or combinations of muscles into play, thereby providing an effective exercising apparatus that will more equally develop the various muscles than is the case with the ordinary vehicle where the same movements are necessarily employed whenever such vehicle is propelled.

A further object is to provide an exceedingly simple structure which can be readily manufactured and is made up of parts not liable to derangement, injury or breakage.

The preferred embodiment of the invention is illustrated in the accompanying drawings, but it will be evident from an inspection of the appended claims that said invention is not limited solely to the structure disclosed.

Figure 1:
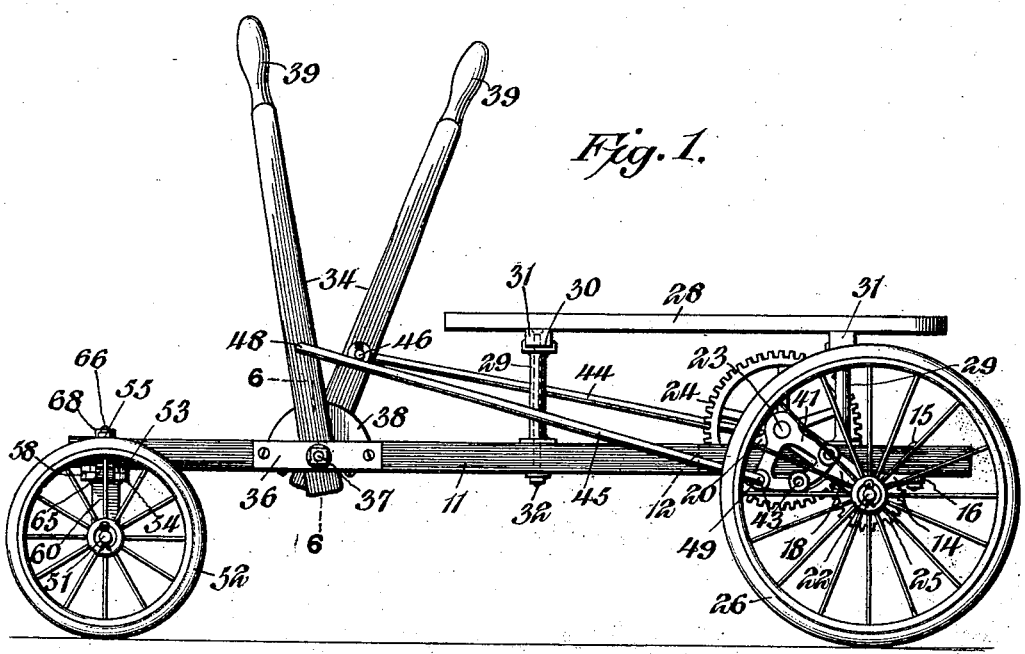
Figure 2:
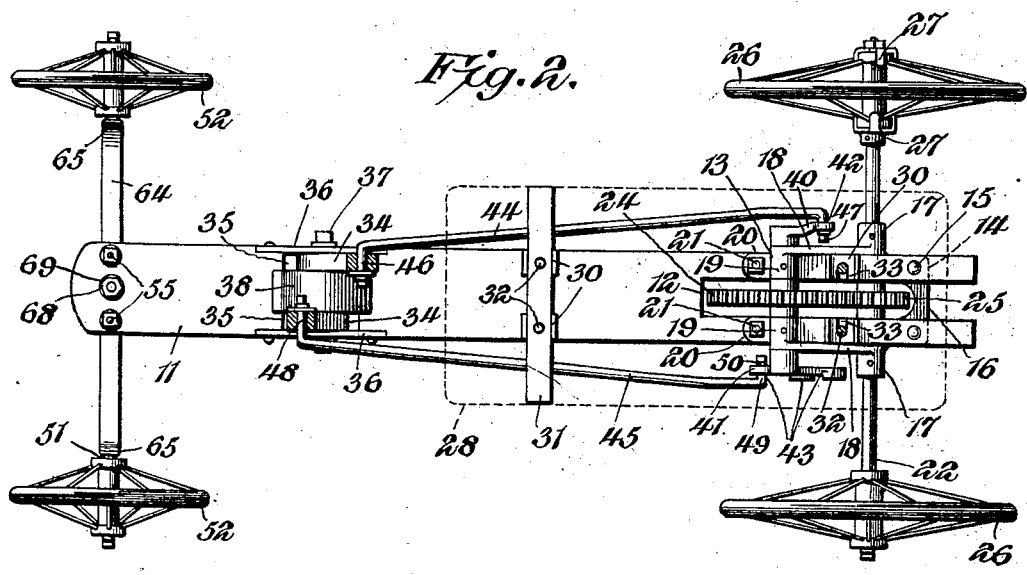

In the drawings: Figure 1 is a side elevation of the vehicle. Fig. 2 is a top plan view of the same with the seat board removed and the levers shown in section. Fig. 3 is a detail longitudinal sectional view on an enlarged scale through the rear portion of the vehicle. Fig. 4 is a cross sectional view therethrough. Fig. 5 is a detail perspective view of the bracket. Fig. 6 is a detail cross sectional view substantially on the line 6—6 of Fig. 1. Fig. 7 is a front elevation of the steering mechanism. Fig. 8 is a view therethrough. Fig. 9 is a bottom plan view of the fifth wheel member that is seured to the supporting bar, and Fig. 10 is a top plan view of the coacting fifth wheel member.

Similar reference numerals designate corresponding parts in all the figures of the drawings.

In the embodiment illustrated, a vehicle body is employed, comprising a strong supporting bar 11, having its rear end bifurcated or slotted, as shown at 12. A journal bracket 13 is secured to said rear end and comprises a base 14, bolted, as shown at 15, beneath the rear slotted end and having a web 16, that extends across the same. Said base is provided with spaced journal bearings 17, located beneath the bar and extending on opposite sides of the same and from the bearings project upwardly and forwardly extending arms 18, that embrace the bar and are provided at their upper ends with spaced journal bearings 19, that are located upon the bar. These bearings are provided with ears 20, through which fastening bolts 21 are passed. The bracket thus provided constitutes a strong reinforcement for the rear end of the bar and provides the bearings for a rear driving axle 22, which extends beneath the bar and is journaled in the bearings 17.

A shaft 23 is journaled in the upper bearings 19 and is thus located over the bar.

Intermeshing gear wheels 24 and 25 are carried respectively by the shaft 23 and axle 22 and constitute the means for transmitting motion from said shaft to the axle.

Ground wheels 26 are located on the ends of the axle and one of said wheels constitutes a driving wheel, being clipped to the axle, as shown at 27.

A seat board 28 is located over the gearing and is supported on posts 29, resting on the bar, said posts having seats 30, in their upper ends that receive crossed cleats 31, to which the board 28 is fastened. Bolts 32, passing through the cleats, also extend longitudinally through the posts 29 and through the bar 11, thus rigidly fastening the parts together. By reference to Figs. 2 and 3, it will be seen that the said bolts 32 pass through open-sided channels 33, in the posts 29, which channels are formed in the inner sides of said posts.

Independent actuating levers 34 are fulcrumed in the opposite sides of the supporting bar 11, in advance of the seat board 28. To this end, said bar has cut out portions 35, that receive the lower ends of the levers, which cut out portions are bridged by plates 36. A pivot bolt 37, passing through the plates, the web between the levers and through said levers, constitutes the fulcrum for the latter. A guide block 38 may be located upon the supporting bar between the levers if desired. The upper ends of said levers are provided with handle grips 39, disposed in convenient relation to the operator sitting upon the board 28. The ends of the shaft 23 project beyond the bearings 19, and to said ends are attached cranks 40 and 41. In the present embodiment, one of these cranks is provided with a single eye or opening 42, while the other has a series of eyes 43. Pitmen 44 and 45 respectively connect the levers and cranks. The pitman 44 has an offset terminal 46, pivotally engaged in one of the levers 34, the other end 47 being correspondingly offset and pivotally engaged in the single eye 42 of the crank 44. The pitman 45 has at its front end an offset terminal 48, pivotally engaged in the other lever 34, while its rear end has an offset terminal 49, that is arranged to be placed in any of the eyes 43 of the crank 41, being detachably secured therein in any suitable manner, as, for instance, by a split key 50.

Mounted on the front end of the supporting bar 11 is a steering axle 51, which carries suitable ground wheels 52 at its rear ends. The mounting for this axle is in the form of a fifth wheel, comprising upper and lower members 53 and 54. The member 53 is in the form of a wear plate, bolted, as shown at 55, to the under side of the bar and having an upstanding boss 56, extending through the bar. It furthermore is provided with a depending circular bearing flange 57, having at one side a downwardly extending stop lug 58. The other member includes a body portion 59, having depending arms 60, suitably secured, as shown at 61, to the axle 51. The front portion of the said member is cut away to form spaced shoulders 62, between which the lug 58 is located. A seat 63, formed in the upper side of the body portion receives a foot-steering bar 64, that extends longitudinally over the axle 57 and has upturned terminals 65. A bolt 66, passing through the two members, also passes through the central portion of the bar 64, this bolt having thereon a wearing sleeve 67, that is located in the boss 56. A nut and washer 68 and 69, placed upon the upper end of the bolt serve to secure the same, and thereby the various parts in operative position.

The manner of using the device will be apparent. The operator is seated upon the board 28, with his feet resting upon the opposite end portions of the steering bar 64. The handles being grasped, upon operating the same, the gear wheel 24 will be caused to revolve, thereby rotating the pinion 25, the axle 22, and the wheel 26, thus propelling the machine. It will be apparent that by placing the rear offset end 49 of the pitman 45 in the different openings, the relative movements of the two levers will be altered. Thus, if it is desired that they move together and simultaneously in the same direction, the pitmen 44 and 45 are arranged with their rear ends in alinement. In operating the vehicle when so arranged, the child will necessarily move back and forth, thus not only exercising the muscles of the arms but also of the back. By changing the relation of the two rear pivots of the pitmen, it will be evident that the levers may be made to move in opposite directions for different portions of their strokes. Thereby not only will the arms operate differently, but a swing will be given to the body that will bring other sets and combinations of muscles into play. While the present embodiment is shown with but one pitman having an adjustable connection with the crank, it will be evident that the arrangement may be readily altered, so that an adjustment may be secured on both sides to obtain the same results. The present embodiment is, however, believed to be the simplest and consequently the best. Outside of the above features, it will be evident that the structure is an exceedingly simple one, a single bar constituting the support for all the parts and being strengthened and reinforced by the bracket on which all the driving strains are brought to bear. Furthermore, this bracket reinforces the rear end of the bar which is slotted to accommodate the gearing.

From the foregoing it is thought that the construction, operation, and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus described my invention what I claim as new and desire to secure by Letters Patent, is:

1. In a vehicle, the combination with a body and driving wheel, of operating means for the wheel including independent actuating devices, and power-transmitting connections between the devices and wheel, said connections being relatively adjustable to obtain and maintain different relative movements on the part of the actuating devices.

2. In a vehicle, the combination with a body and driving wheel, of operating means for the wheel including independent actuating devices having back and forth movements, and power-transmitting connections between the devices and wheel, said connections being relatively adjustable to obtain and maintain different relative movements on the part of the actuating devices.

3. In a vehicle, the combination with a body and driving wheel, of operating means for the wheel including independent swinging actuating levers, and power-transmitting connections between the levers and wheel, said connections being relatively adjustable to obtain and maintain different relative swinging movements on the part of the actuating devices.

4. In a vehicle, the combination with a body and driving wheel, of operating means for the wheel including independent actuating devices having back and forth movements, a single rotating member, and power-transmitting elements connected to the actuating devices and having relatively adjustable connections with the single rotating member to obtain and maintain different relative movements on the part of the actuating devices.

5. In a vehicle, the combination with a body and driving wheel therefor, of a single rotating member geared to the wheel, swinging actuating levers, and power-transmitting devices separately connected to the levers and having relatively adjustable connections with the single rotating member to obtain and maintain different relative movements on the part of the levers.

6. In a vehicle, the combination with a body and driving wheel therefor, of a rotary member geared to the wheel and having spaced relatively fixed cranks, independent actuating devices, and separate pitmen connected to the devices and each connected to one of the cranks, one of said devices having an adjustable connection with its crank in order to change the relative positions of the connections of the devices on the rotary member and change the relative movements of the devices.

7. In a vehicle, the combination with a body, of an axle rotatably journaled thereon, a shaft journaled on the body, gears connecting the shaft and axle, cranks carried by the ends of the shaft, one of said cranks having a series of openings, separate levers pivotally mounted on the body, and separate pitmen, each connecting one of the levers and a crank, one of said pitmen having an engagement in any of the openings of the crank having the same.

8. In a vehicle, the combination with a bar having a slotted rear end, of a bracket comprising a base extending across the slot and having spaced journal bearings, spaced side arms carried by the bearings and extending upwardly outside the bar and the slot thereof, journal bearings carried by the upper ends of the arms and arranged above the bar on opposite sides of the slot, an axle journaled in the lower bearings, a driving wheel carried by the axle, a shaft journaled in the upper bearings, intermeshing gearing carried by the shaft and axle and being located in the slot, and actuating means mounted on the bar and connected to the shaft.

9. In a vehicle, the combination with a supporting bar having a bifurcated rear end, of a bracket comprising a base portion extending across the bifurcation and having journal bearings, upwardly extending arms embracing the bar and having bearings located thereon and secured thereto, an axle journaled in the lower bearings and having a drive wheel, a shaft journaled in the upper bearings and extending above the bar, gearing connecting the intermediate portions of the shaft and axle and extending through the bifurcation, cranks carried by the ends of the shaft, one of said cranks having a plurality of openings, a seat board mounted on the bar over the gearing, levers fulcrumed on the bar in advance of the seat board and extending above the same, and pitmen connected to the levers, one of said pitmen having an adjustable engagement in the different openings of said crank, the other having an engagement with the other crank.

In testimony, that I claim the foregoing as my own, I have hereto affixed my signature in the presence of two witnesses.

SAMUEL DYER.

Witnesses:
A. C. SILVERBURG,
N. P. GREENE.